United States Patent [19]

Jackson et al.

[11] Patent Number: 4,974,961
[45] Date of Patent: Dec. 4, 1990

[54] OPTICAL FIBRE MEASURING SYSTEM

[76] Inventors: David A. Jackson, c/o The Physics Laboratory, University of Kent,, Canterbury, Kent, CT2 7NR; Beverley T. Meggitt, c/o Research and Development Division, Sira Limited,, South Hill, Chislehurst, Kent BR7 5EH, both of England; Pedram a. Leilabady, c/o Ampthenal limited, 1925 Ohio St., Lisle, Ill. 60532

[21] Appl. No.: 94,768

[22] Filed: Sep. 10, 1987

[30] Foreign Application Priority Data

Sep. 12, 1986 [GB] United Kingdom ............... 8622082
Feb. 17, 1987 [GB] United Kingdom ............... 8703651

[51] Int. Cl.⁵ .................................................. G01B 9/02
[52] U.S. Cl. ........................................................ 356/345
[58] Field of Search ........................................... 356/345

[56] References Cited

U.S. PATENT DOCUMENTS 3,458,259 7/1969 Bagley et al. .
4,551,019 11/1985 Vella et al. .
4,552,457 11/1985 Giallorenzi et al. ................ 356/345
4,714,342 12/1987 Jackson et al. ................ 356/345 X
4,832,489 5/1989 Wyant et al. ................ 356/360 X

FOREIGN PATENT DOCUMENTS

A-2722887 6/1978 Fed. Rep. of Germany .
A-2437609 4/1980 France .
1302068 1/1973 United Kingdom .
1472894 5/1977 United Kingdom .
A-2032098 4/1980 United Kingdom .
2087545 5/1982 United Kingdom .
2138936 10/1984 United Kingdom .
A-2145514 3/1985 United Kingdom .

OTHER PUBLICATIONS

Techniches Messen TM, vol. 52, No. 6, Jun. 1985, pp. 225-232.
Optics communications vol. 45, No. 2, Mar. 15, 1983.

Primary Examiner—Davis L. Willis
Assistant Examiner—Matthew W. Koren
Attorney, Agent, or Firm—Larson & Taylor

[57] ABSTRACT

Optical fiber measuring systems using an interferometer are disclosed. The measuring range of the system are extended by the use two wavelengths of radiation during the measurement. The phases of the light at each wavelength may be compared, or the radiation of one wavelength may be used to calibrate the radiation of the other wavelength.

9 Claims, 8 Drawing Sheets

OPTICAL FIBRE MEASURING SYSTEM

BACKGROUND OF THE INVENTION

1. FIELD OF THE INVENTION

The present invention relates to an optical fiber measuring system using an interferometer.

2. SUMMARY OF THE PRIOR ART

It is known to supply radiation, from e.g. a laser diode, to an interferometer and then, by monitoring by any changes in the output of the interferometer, to detect changes in that interferometer. These latter changes may be caused, for example, by temperature changes or vibrations which alter parameters of the interferometer, and by monitoring the changes in the output the changes in the interferometer may be determined and so determine the temperature change involved.

When radiation is passed through a single fiber optic interferometer system, its intensity is modulated in proportion to the cosine of the optical path inbalance of the system. Methods are known for detecting and measuring accurately the phase of this cosine function. Provided that the coherence length of the radiation source is greater than the optical path length of the interferometer, such cosine modulation will be reduced. Furthermore, the change in phase of the interferometer output is inversely proportional to the wavelength used and directly proportional to the change in optical path difference.

However, a sensor utilising this principle gives unambiguous results over only one interferometer period. Since this is related to, and is of the order of, the wavelength of radiation employed the dynamic range of sensor is severely limited, particularly when optical wavelengths are used. Any larger change results in a change in an unknown number of integral interferometer periods, in addition to the fraction of the period which can be detected (it is only possible from phase relationship to determine fractions of a period). It would be possible to provide a system in which the number of integral period changes was counted, and then the fraction of a period determined from the phase, but this method is both difficult to achieve and depends on having some suitable reference from which the count may be started. Thus, it would be possible to calibrate such a system to a known temperature, and then detect the changes from that temperature by counting integral period changes and then determining the additional fractional change, but clearly the system is dependent on the accuracy of the reference, and also the information about that reference is lost when the sensor is turned off, whether deliberately or due to accidental power failure.

SUMMARY OF THE INVENTION

Therefore, the present invention proposes that radiation of two different wavelengths be fed to the interferometer via an optical fiber, and the phase relationship between the two interferometer output signals in the optical fiber be analysed. Provided the wavelengths of the radiation are known, it becomes possible to determine unambiguously a change over several interferometer periods, because those periods will be slightly different for the two wavelengths.

The radiation used in the present invention may be ultra-violet, visible light, or infra-red radiation (hereinafter referred to simply as "light"). In practice, if commercially available laser diodes are to be used, the radiation will, in fact, be in the near infra-red. It is not necessary, however, to use such a laser diode, and instead any other coherent or partially coherent source may be used.

As stated above, the present invention applies radiation of two different wavelengths to an interferometer via an optical fiber, and analyses the changes produced by changes in the interferometer characteristics in the optical fiber. It is possible simply to compare the phases of the light of each wavelength, to give an unambiguous result over a certain range. For high resolution, it is desirable that this system uses relatively widely spaced wavelengths, as this ensures suitable resolution and dynamic range. It is also possible, however, to use radiation of one length simply to calibrate the radiation of the other wavelength. Thus, phases of the light from each lighted diode are compared, and used to determine one of the interferometer fringe patterns to $\pm \frac{1}{2}$ fringe, and then use the phase information of light of one wavelength to obtain more precise measurement. Effectively, light of one wavelength is used to calibrate the light of the other wavelength, and indeed once this calibration has been done it is possible to operate entirely light of one wavelength, by counting the integral phase changes and then determining the phase calculate changes involving fractions of a period. Further calibration may be necessary when the device is switched off and on, or at periodic intervals to ensure that no errors develop in the calculation of the number of period changes. With this system, the wavelengths need have only a very small separation, and furthermore since only one wavelength is being studied, a more rapid response can be obtained from the sensor.

An optical fiber measuring system according to the present invention preferably has at least two interferometers, both receiving radiation from the two sources. One of these interferometers is under standard conditions, and acts as a reference against which changes in the other may be calculated.

It is possible for a system according to the present invention to be embodied in a two-arm system, one arm being maintained in reference conditions, or a plurality of arms may be provided all receiving light from the same two sources.

BRIEF DESCRIPTION OF THE DRAWINGS

Embodiments of the present invention will now be described in detail, by way of example, with reference to the accompanying drawings, in which:

FIG. 1a shows a first embodiment of an optical fiber measuring system according to the present invention;

FIG. 1b shows a detail of the system of FIG. 1a;

DETAILED DESCRIPTION

Figure 1:
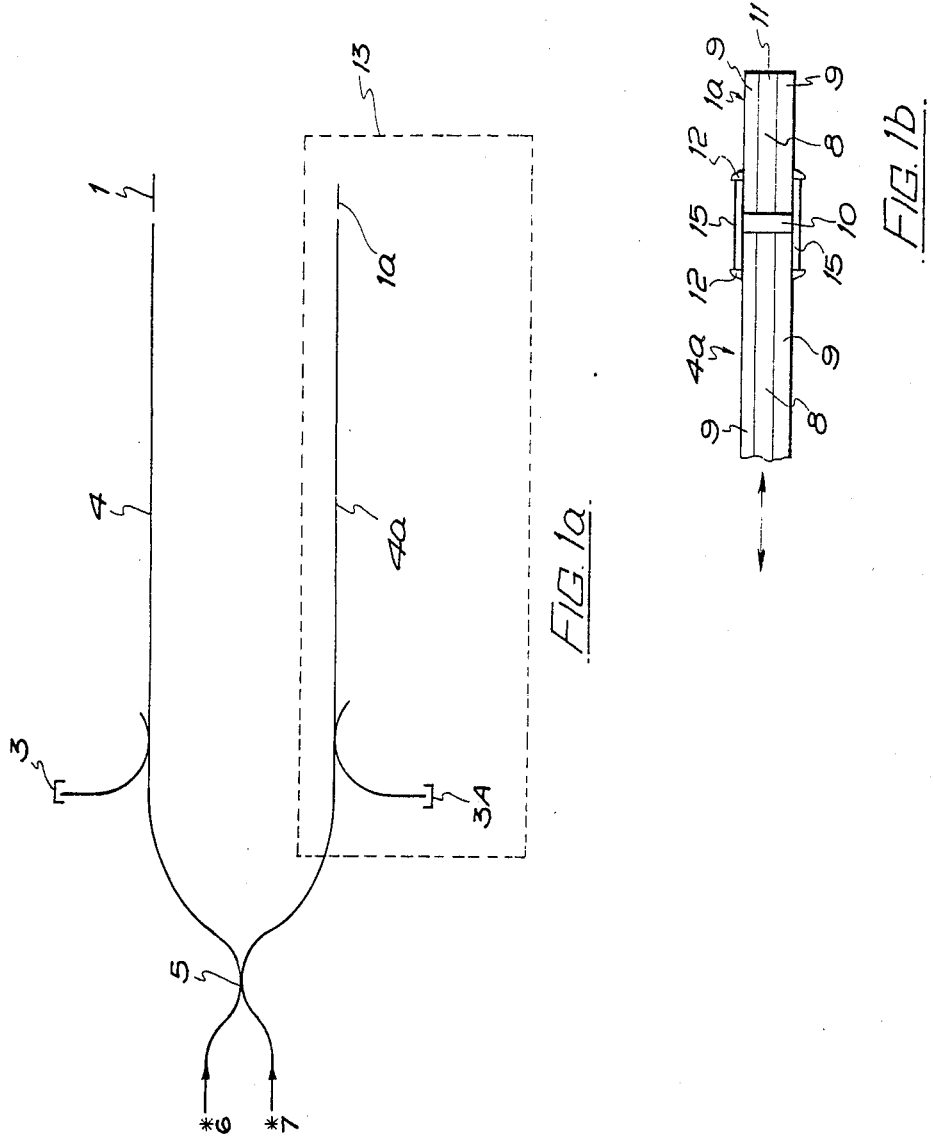

Referring first to FIG. 1; two interferometers 1,1a are connected via optical fiber links 4 and 4a respectively to light sources 6 and 7 via a single mode coupler 5. This coupler 5 enables the light from either of the sources 6,7, to be directed to either of the optical fiber links 4, 4a. Light from e.g. one source is transmitted via the optical fiber link 4 to the interferometer 1, and is reflected from that interferometer back down the optical link 4 to a detector 3.

FIG. 1b shows a detail of the end of the optical fiber link 4 and the Fabry-Perot interferometer 1 (or the link 1a and the interferometer 1). Both the link 4 and the interferometer 1 comprise a single mode fiber core 8 surrounded by a cladding layer 9. There is an air-glass interface at each end of the interferometer 1, and reflections at these interfaces 10,11 cause two wavelength trains passing down the core 8 of the link 4, with a difference in phase determined by the length of the interferometer 1. The Fabry-Perot interferometer fiber is formed by heating a glass capillary tube 15 and drawing it to a tapered tube with a minimum diameter slightly less than that of the fiber (250 $\mu$m). A part of the tube of length approximately 0.1 m is then selected to provide a tight fit for the fiber. The fiber is inserted in the tube, partially withdrawn and marked with e.g. a diamond tipped cleaver and reinserted. The fiber is then pulled until it cleaves within the tube and cyanoacrylate 12 adhesive then secures the fiber in place.

The method is advantageous because the relative alignment of the central cores of fibers 4 and 1 are maintained thus ensuring good optical coupling between them.

Thus, an optical cavity is set up within the interferometer 1, the length of which corresponds to the separation of the interfaces 10,11. Furthermore, as shown in FIG. 1b, cement 12 is provided at the interface 10 to hold the two fibers forming the interferometer 1 and the fiber link 2 together.

Two lens systems are required to launch the laser radiation into the core of the single mode optical fiber. One will collimate the light from the sources, which may be laser diodes, and the second will focus this collimated beam into the fiber core. There are several points which need to be considered in performing these operations. To prevent any radiation that has been launched into the fiber system from being reflected back into the laser cavity, a Faraday-type optical isolator is placed between the two lens system in the collimated beam. Such radiation reflected back into the laser diode produces undesirable modulation effects and needs to be eliminated to permit satisfactory operation of the sensor.

The characteristic performance of the isolator gives an amount of back reflected radiation which increases as the wavelength used deviates from its designed value. At this designed wavelength, the degree of back reflected isolation is slightly greater than 30 dB. If the wavelength used deviates from the central design value by more than ±10 nm, then the degree of isolation falls below the 30 dB level. It is desirable not to let the isolation level drop much below the 30 dB mark, and therefore, the laser diode wavelengths should be specified to within ±10 nm of the isolators design value. As mentioned earlier, the laser diodes have a toleranced ±20 nm (and ±30 nm) band but by specifying the values required the suppliers will select devices close to the desired value. So therefore, it should be quite practical to obtain the laser diodes to match the optical isolator performance (±10 nm).

The profile of the beam emitted from the laser is elliptical in the plane normal to the direction of propagation. No astigmatism is present in the emitted beam. Two options are possible when producing a collimated beam. One is use a simple objective system to produce a collimated beam. The beam profile will be elliptical with a 3:1 aspect ratio between its axis. The aperture of the optical isolator is specified at 2 mm, and therefore, the beam diameter needs to be matched to this value. The second option is to produce a circularly-shaped beam profile by use of additional optical elements (e.g. spherical and cylindrical lenses). What needs to be analysed is the efficiency of launch power each will produce when focused down optimally into the fiber core. There is a relation between the minimum spot size produced and the beam numerical aperture (convergence). These have to be matched to those of the fiber core. That is the spot size of $^{1}85$ $\mu$m and a numerical aperture of 0.1. The most effective method of achieving this needs to be determined.

The long term stability of the assembled unit needs careful design. Since it is necessary to keep the focused beam aligned with the fiber core, any effect which is likely to disturb the alignment of the assembly should be minimised. The most dominant effects will be mechanical shock and thermal changes. Therefore, the components should be rigidly mounted and the use of a very low thermal expansion template (e.g. Zerodur) should be considered where all the optical elements are fixtured to a single machined unit. Some initial adjustments will be necessary, but once alignment has been performed, the elements would then be permanently secured.

In order to prevent other than the core modes being launched into the fiber, some form of mode stripping will be necessary. A convenient way to achieve this is to use a short length of specially doped cladding fiber at the launch end. Such a fiber absorbs any launched cladding modes and prevents them from propagating down the fiber. This short length would be fusion spliced onto the end of the coupler assembly.

The above type of interferometer is known as a Fabry-Perot interferometer, but other known types of interferometers may be used such as a Michelson type or a Mach-Zenders type.

FIG. 1 also shows the interferometer 1 being used in a reflective mode, but it is also possible to use it in a transmissive mode, but in this case a second fiber link is needed to connect the interferometer 1 to the detector.

In operation, radiation from the two sources 6,7 is directed via the coupler 5 into the optical link 4, is reflected at the interferometer 1, and the resultant output is detected at the detector 3. By analysing the phase relationship between the two signals, and in particular detecting any change in that phase, it is possible to detect changes occurring in the interferometer due to e.g. a temperature change. It is preferable that a second optical link 4a is provided linking the coupler 5, and hence the sources 6,7, to another interferometer 1a and another detector 3a maintained in an enclosure 13 maintained at constant conditions. In this way, the branch of the system formed by interferometer 1a, detector 3a, and link 4a act as a reference against which the other arm can be compared.

Figure 2:
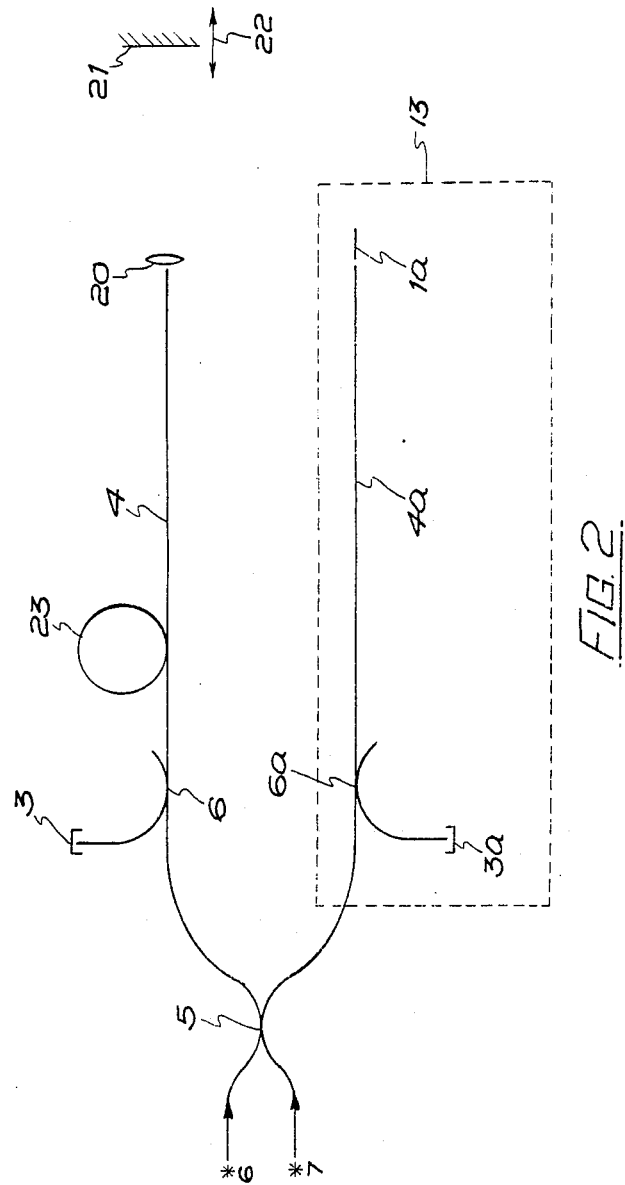
FIG. 2 shows a second embodiment of an optical fiber measuring system according to the present invention.

FIG. 2 shows a measuring system generally similar to that disclosed in FIG. 1 in which two interferometers are connected via optical fiber links 4 and 4a to light sources 6 and 7 via a single mode coupler 5. This coupler 5 enables the light from either of the sources 6,7 to be directed to either of the optical fiber links. Each fiber link has an additional single-mode coupler 6,6a which is used to separate the light returning from the interferometers. As in FIG. 1, the interferometer 1a of one link 4a is contained within a suitable enclosure 13 to act as a reference arm. Thus, to calibrate the system light from each of the sources 6,7 is transmitted via the coupler 5 and the optical fiber 4a to the interferometer 1a and is reflected back down the optical fiber 4a to a detector 3a via coupler 6a. The interferometer 1a is formed by a short length of optical fiber, as in the interferometers used in FIG. 1. The interferometer of the optical fiber link 4 is different, however, and has a lens arrangement 20 which collimates light from the optical fiber link 4a onto a reflective surface 21, such as a mirror or reflective tape, from which it is reflected back through the lens arrangement 20 to the optical fiber link 4 and hence to a detector 3 via coupler 6. The optical path length of the interferometer is thus determined by the separation of the lens arrangement 20 and mirror 21. Any change in that separation therefore (generally indicated by arrow 22) will cause a variation in the interference of the light from the two sources 6,7 and the detection and analysis of this variation will enable the change in separation to be determined. Thus, by mounting the optical fiber link 4 on one object and the mirror 21 on another object, precise measurements of the separation and variations in the separation, of the two objects may be obtained. This is applicable for example, to the study of the vibrational spectrum of a surface particularly if it is inaccessible, for example inside electrical machinery.

The optical fiber link 4 of FIG. 2 also contains a delay line 23. The reason for this is that sometimes cross-coupling occurs between the two links 4 and 4a. This can be eliminated by making the optical path of one link much longer than the other. Thus a length of optical fiber (e.g. greater than the coherence length of either of the optical sources 6 or 7 typically between 10 and 30 m) is included in one of the optical fiber links to form the delay line 23, and this eliminates cross-coupling. Such a delay line may also be used in the arrangement of FIG. 1 for the same purpose.

A third embodiment of the present invention being a modification of the first embodiment will now be described with reference to FIG. 3. In this embodiment, the number of sensor probe arms has been increased by combining together several similar couplers 5 into a tree array. The first coupler 5 in the array receives light from the two sources 6,7 (as in the first embodiment) but its output is fed to two other couplers 5, which in turn split the light up to additional couplers. This process can be, repeated until as many outputs as needed are obtained. Each coupler at the end of the tree array furthest from the sources 6,7 is connected to two optical links 4, each of which terminates in an interferometer 1.

Each link 4 is also provided with a detector 3, again as in the first embodiment. In this arrangement, each of the transfer functions from the different interferometers are detected independently of one another. This permits each sensor cavity to be identical in optical path length and hence produce the same frequency output signal. Such a standard output signal waveform permits a single signal processing electronic unit to be multiplexed between the different interferometers.

Figure 3:
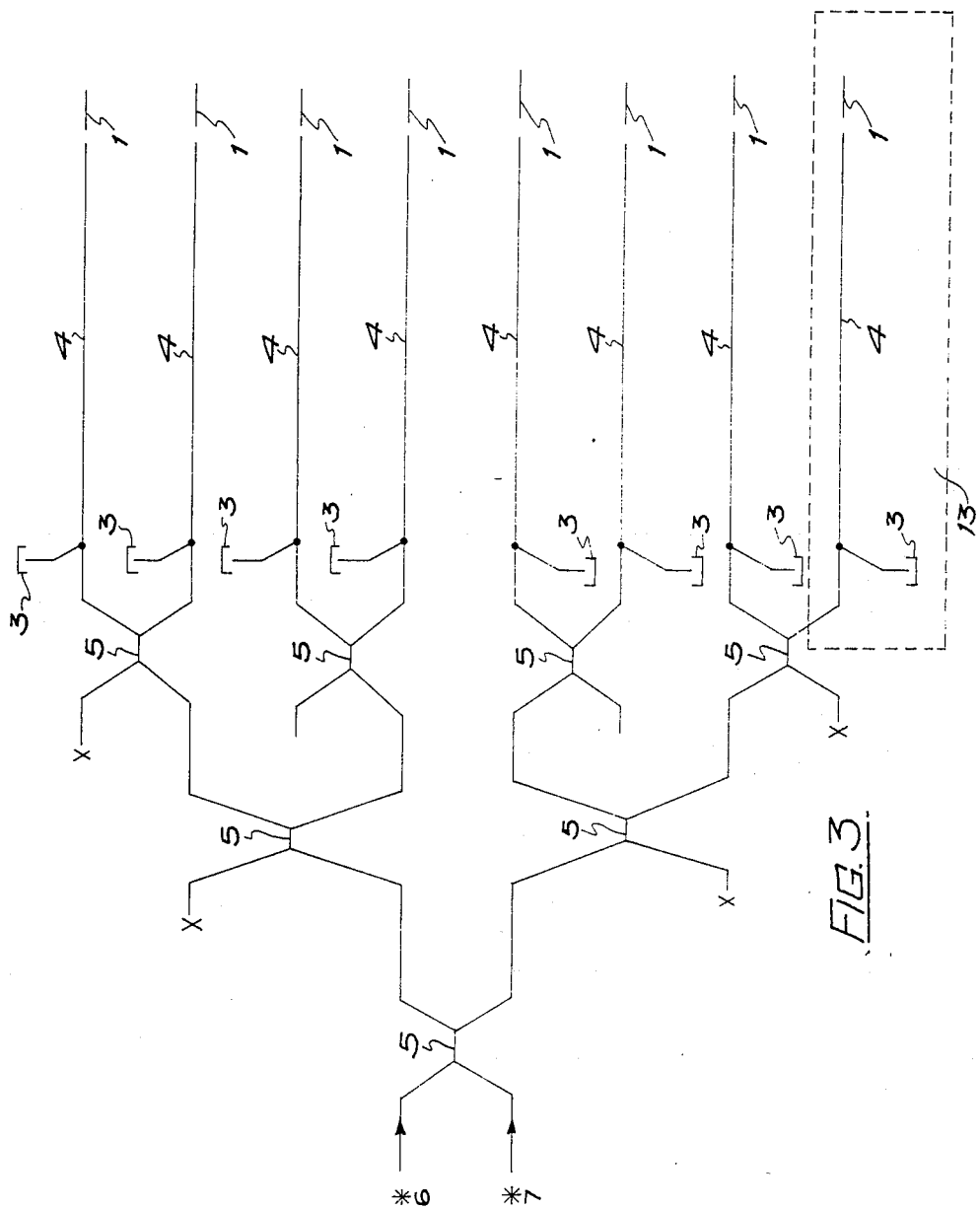
FIG. 3 shows a third embodiment of an optical fiber measuring system according to the present invention.
Figure 4:
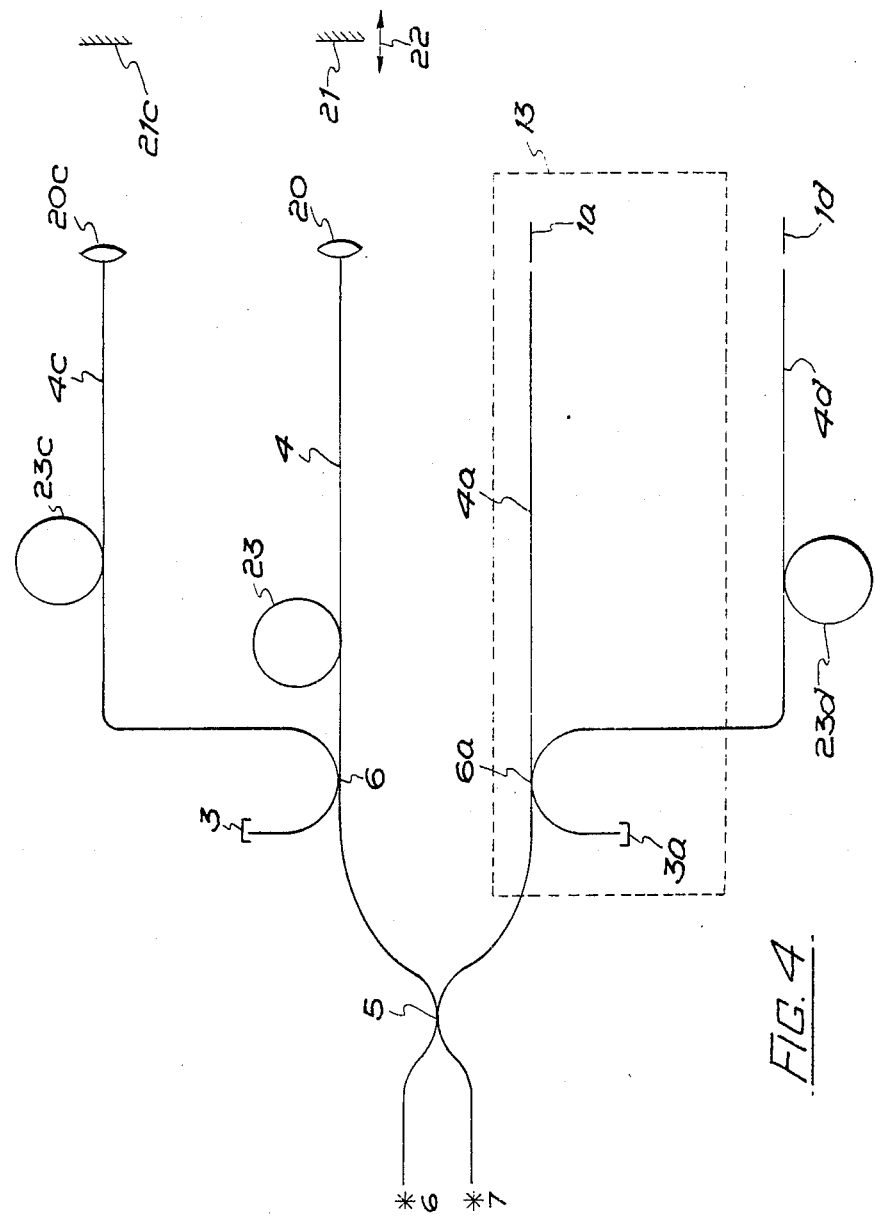
FIG. 4 shows a fourth embodiment of an optical fiber measuring system according to the present invention.

As was the case for FIGS. 1 and 3, additional sensors can be incorporated into the embodiment of FIG. 2 as shown in FIG. 4. This differs from the arrangement of FIG. 2, in that there are additional fiber links fed by fibers 4b and 4c, the optical path length of each sensor being chosen such that they can be demultiplexed by a frequency ramping technique. There may then be two further interferometers. As illustrated in FIG. 4, the fiber link 4c terminates in an interferometer with a lens 20c and reflective surface 21a, whilst the fiber link 4d terminates in another Fabry-Perot interferometer 1d. In such a system the four separate sensors could be operated simultaneously. Furthermore, the sensors may, as illustrated, be of different types, for example if it was necessary to monitor both bearing wear and the internal temperature of an electrical generator then two sensors could be operated as non-contact displacement sensors analysing the motion of the bearing and the other two sensors operated as temperature sensors placed inside the generator. Additional fiber delays 23c and 23d are also incorporated in fiber links 4c and 4d to reduce cross coupling between each sensor.

When configuring the Fabry-Perot sensor in a multiplexed sensor array, it is necessary to consider the amount of power returned to each of the detectors. Each coupler will divide the input radiation 50% into the two output ports. There will also be a residual loss in the coupler itself, usually of the order of 1 dB. The power reaching each sensor probe will be:

Power at sensor=[Power Input]/[[No. of Probes]×[2]]

At the Fabry-Perot sensor each of the air/glass interfaces will reflect ~4% of the incident radiation. Therefore, the total radiation power reaching the each detector will be:

Power at detector=[2]×[Power Input]/[[No. of Probes]×[2]]×[2E−2]

Assuming that the optical power launched into the fiber core from the laser diode is of the order of 1 mW, then the power returned to each detector will be:

Power at detector=0.02/[No. of Probes] mW

For the 4 probe device, Detector Power=5μW

For the 8 probe device, Detector Power=2.5 μW

The noise will be contributed from the detector noise level and the laser noise. The detector noise is ~3E−14 W Hz. If the modulation is performed at 10 KHz this is of the order of ~3E−12 W, and is significantly lower than the returned signal.

The additional loss in the couplers due to residual effects will reduce the signal power further. In the four probe design this will be by 4 dB and in the eight probe design, by 5 dB. The power levels are now ~2 μW and 1μW respectively.

It is preferable in the present invention to use single mode laser diodes as the sources (6,7). It is well-known in the art that by modulating the drive current of such laser diodes about a bias operating current, the output wavelength of the device can be modulated. As is also well-known in the literature, by applying a periodic linear current ramp to the laser diode the interferometer output can be driven over one complete cosine fringe. Subsequent changes in path length imbalance of the interferometer will then be observed as a change in phase of this cosine signal. It is also well-known that the phase change produced in a two-arm interferometer is given by:

Phase change=[2×π]×[optical path length change]/[wavelength].

Therefore, for a given optical path length change of the interferometer the phase changes experienced by the two interrogating laser diode wavelengths will be different. The optical path length change over which the two wavelength radiations are coincidently in phase is the effective synthetic wavelength of the two sources. This has the form:

$$\text{Wavelength (effective)} = \frac{[\text{Wavelength}(1) \times \text{Wavelength}(2)]}{[\text{Wavelength}(1) - \text{Wavelength}(2)]}$$

The interferometer period is of a general form,

Optical Path Change=[Effective] Radiation Wavelength

Hence, by increasing the effective operating radiation wavelength, the optical path change giving rise to one interferometer period is also increased. By adjusting the effective wavelength to equal the optical path change experienced by the cavity during an optical path change of interest, it is possible to achieve an unambiguous output over this range. The unambiguous interferometer range has now been extended from the order of one optical wavelength to a much greater range, so that it is better matched to more commonly induced changes on the optical properties of optical fibers.

In order to illustrate the sensing scheme a particular type of fiber optic interferometer is examined by way of example. A fiber Fabry-Perot type of interferometer is fabricated at the end of a single mode fiber (as in FIG. 1). The only sensitive part of the system is the cavity itself, with the connecting fiber/s to/from the laser diodes/detectors proving insensitive to parametric changes. The cavity formed by the interferometer cavity is formed by radiation reflected back down the connecting fiber from the glass-air interface provided at each end of the cavity fiber. Should the optical path length of this optical cavity alter due to some external influence, there will be, in consequence, a change in phase of the interference fringe pattern resulting from the cavity. An increase in optical path length of one half a wavelength of the radiation used will result in a full 360 degree movement in phase of the interference fringe.

Each of the laser diodes acting separately will experience a slightly different phase change as the cavity length changes and the extent of this difference will increase as the cavity length increases. By monitoring the magnitude of this relative phase change the corresponding cavity length change is determined. The relationship between the change in cavity length and the measure of interest then gives the required result. It is possible to operate the two laser diodes continuously and use the two photo-diodes (with additional fiber coupler) to obtain the two separate transfer functions necessary to extract the phase information. This would require the use of optical filters in front of each diode to separate the two signals.

A different method would be to modulate the drive currents of the two laser diodes at different frequencies, but still maintaining the condition that each laser diode produces one cosine interference fringe at the interferometer output. A single detector can now be used to observe the behavior of the two laser wavelengths. The two signals are separated out by electronic band pass filters each centered at the modulation frequency of one of the laser diodes. First the phase of each laser diode is measured and stored relative to its particular wavelength ramp frequency. The two separate phase values are then subtracted to give the phase difference of the two wavelengths.

An alternative method is to activate the two laser diodes separately such that the photo-diode will alternately see the transfer function produced by each laser in turn. The phase of each laser is compared with the filtered laser modulation waveform. The phase of one laser relative to this waveform is stored in a memory and subtracted from the phase produced from the second laser.

Figure 5A:
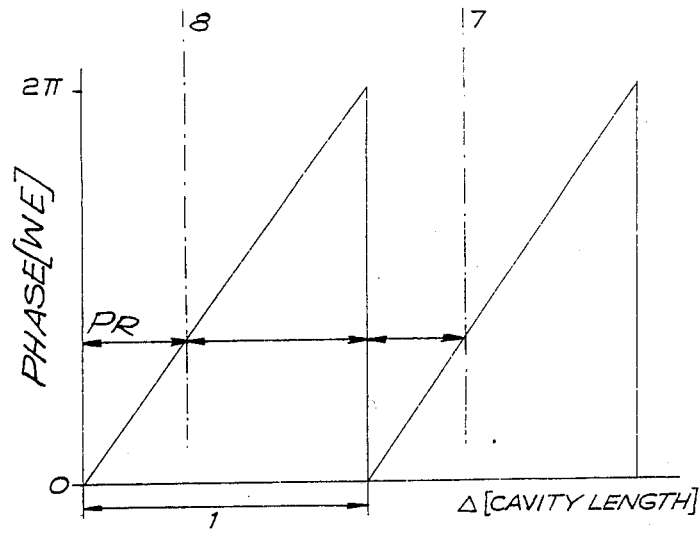
FIG. 5a shows the relationship between the phases of the two laser wavelengths and the cavity length change over the unambiguous range.
Figure 5B:
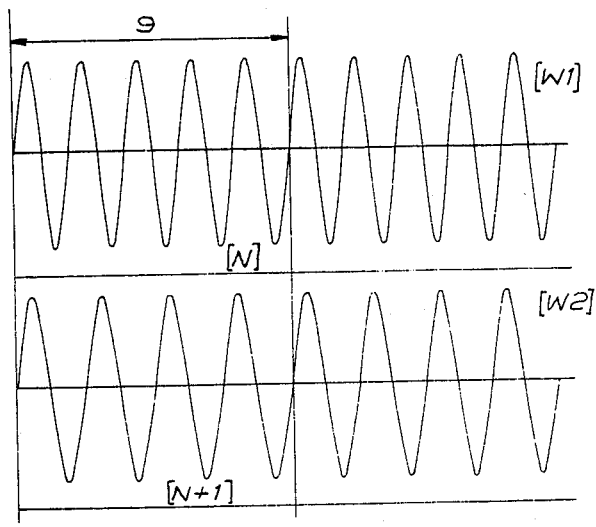
FIG. 5b shows interferometer cosine functions and generated synthetic wave.

Either of these methods will provide the relative phase information from which the cavity length change can be determined. The relationship between the phases of the two laser wavelengths and the cavity length change over the unambiguous range is illustrated in FIGS. 5a and 5b.

The wavelengths of the laser diodes are preferably selected, and the interferometer optical cavity length chosen, such that one wavelength laser experiences N number of interferometer periods during one dynamic range excursion of the interferometer cavity while the other wavelength laser, operating in the same cavity, experiences N+1 number of interferometer period changes. Hence, the relative phases of the two interferometer periods goes through a 360 degree change during a full dynamic range excursion of the interferometer.

The relationship between the extent of the wavelength modulation of the laser diode output wavelength (ΔW) and the cavity length (L) and refractive index (n) can be shown to be:

ΔW=[W×W/(2nL)]

It is assumed, as an example, that the Fabry-Perot cavity is to be used to measure temperature. The sensitivity of single mode silica fiber related to the change in phase of transmitted radiation is typically 100 radians per degree C per meter length.

The increase in optical path difference is given by:

d[opd]=2d[nl]

d[opd]=100/(2×π)×T×L×[W1]

The temperature range over which a two wavelength sensor using wavelengths [W1], [W2] and effective wavelength [WE], will operate is given by:

$$\Delta T = \frac{[WE]}{[W1]} \times \frac{[2 \times \pi]}{[100 \times L]} \text{ where } [W2] > [W1]$$

Since, [WE] = [W1] × [W2]/[[W1] − [W2]]

$$\text{Then} \quad \Delta T = \frac{[W2]}{[[W1] - [W2]]} \times \frac{[2 \times \pi]}{[100 \times L]}$$

For example, with wavelengths 750 nm and 830 nm (standard laser diode wavelengths) then the unambiguous temperature range is of an optical cavity 5 mm long is:

[W1]=750 nm, [W2]=830 nm, ΔT=65.19 C

The resolution of the measurement of ΔT can be determined by considering the resolution obtained in the measurement of the phase of the transfer functions related to [W1] and [W2] wavelengths. The phase of the two individual transfer functions can be measured electronically to within 1 m radian and since the phase of the synthetic wave is given by:

Phase of [WE] = Phase [Ref] + [[Phase [W1] − [Phase [W2]]

the resolution is ~3 m radians. Also of note is that while the synthetic wave [WE] goes through 2π phase change, laser diode 1 [W1] and laser diode 2 wave [W2] go through, many fringes given by:

| Number of [W1] Fringes, N1 | = [WE]/[W1] |
| --- | --- |
| | = [W2]/[[W1] − [W2]] |
| | = 10.375 Fringes |
| Number of [W2] Fringes, N2 | = [WE]/[W2] |
| | = [W1]/[[W1] − [W2]] |
| | = 9.375 Fringes |
| i.e. [N1 − N2] | = 1 Fringe as required. |

Figure 6:
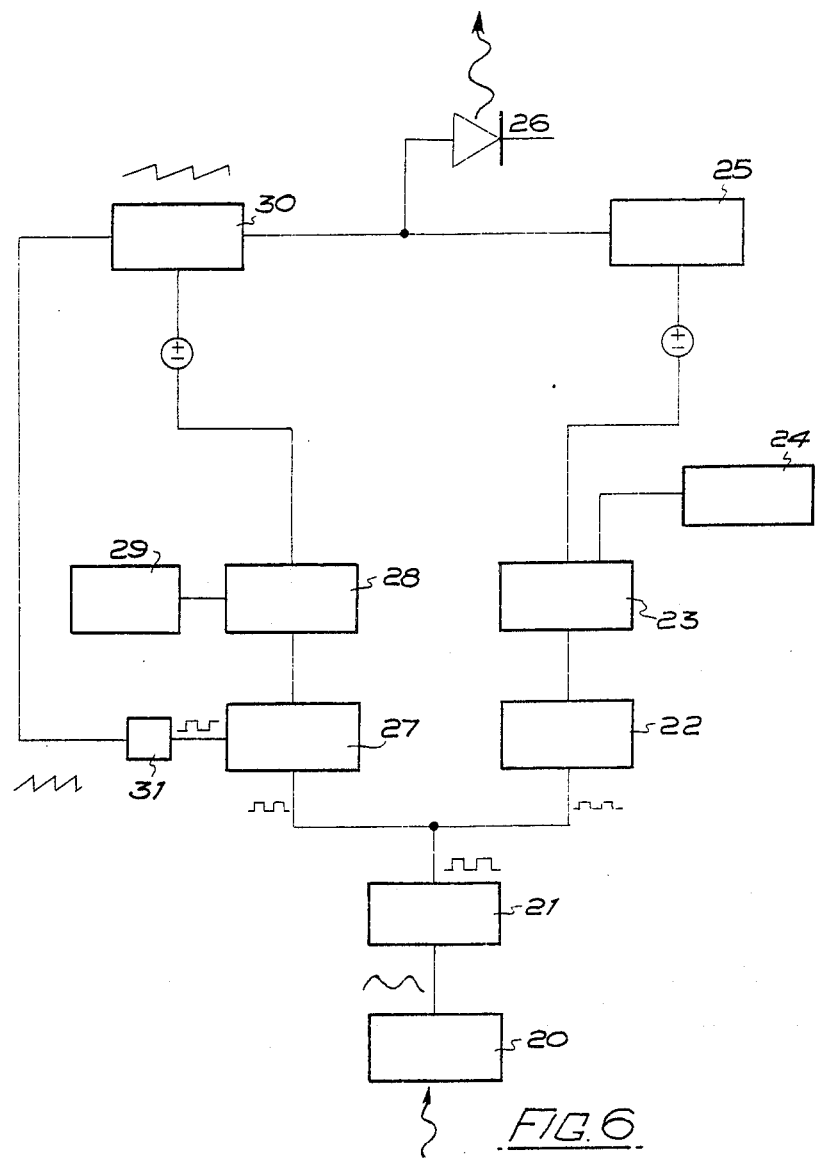
FIG. 6 shows a schematic diagram of an electronic circuit for processing the signals from the reference arm of the embodiments of FIGS. 1 to 4.
Figure 7:
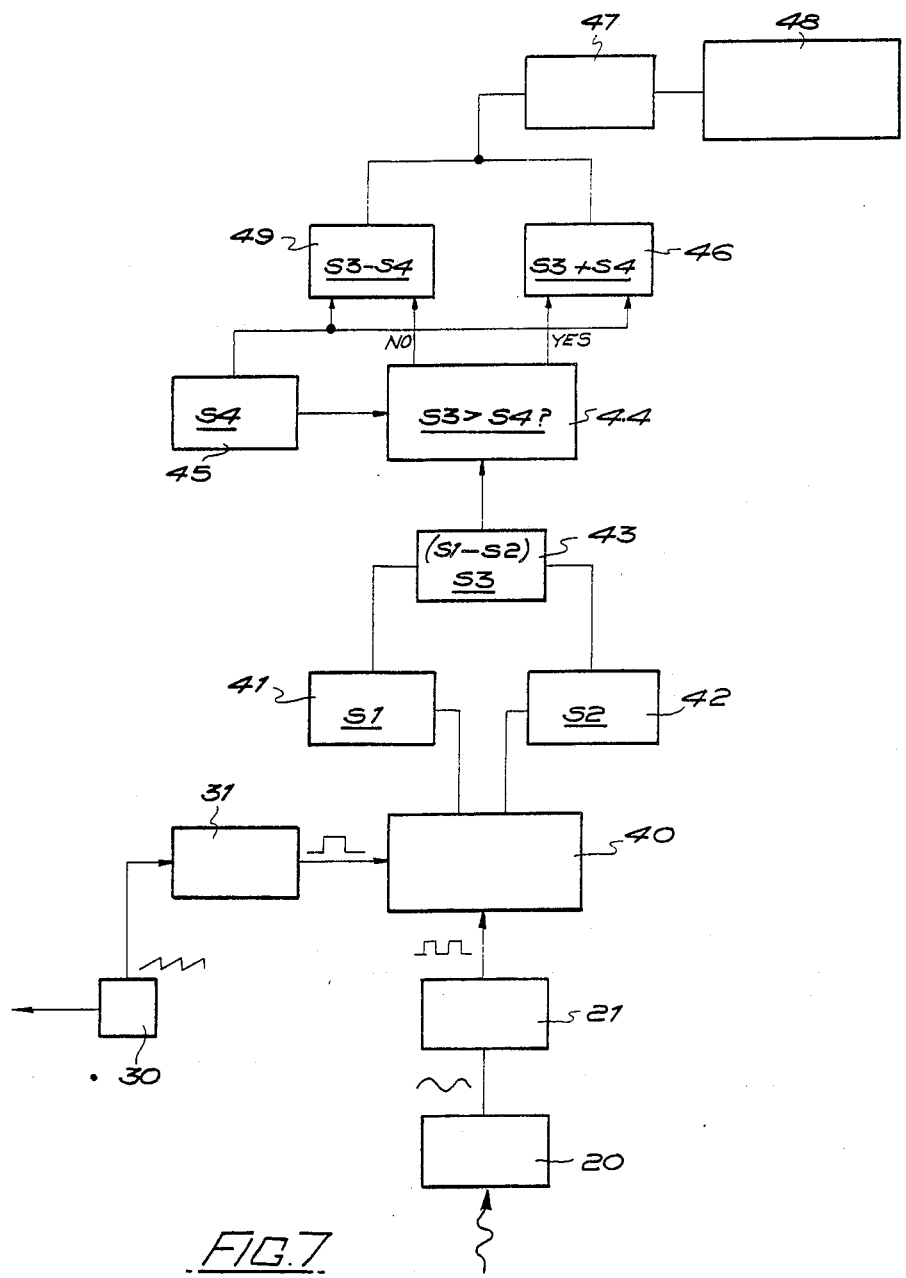
FIG. 7 shows a block diagram of an electronic circuit for processing the output of a signal arm of the embodiment of FIG. 1.
Figure 8:
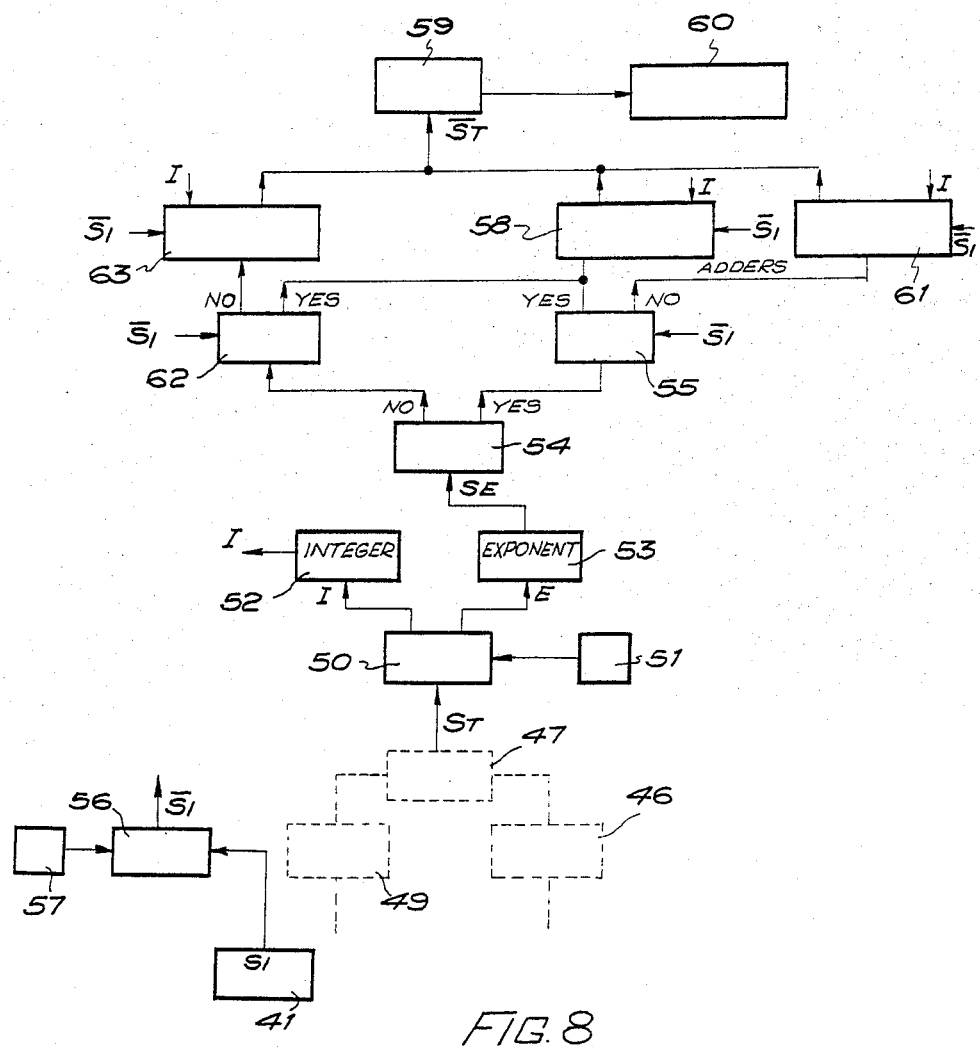
FIG. 8 shows a block diagram of additional circuitry for increasing the resolution obtainable from the circuit of FIG. 5.

A suitable example of a circuit having the processing logic required to perform the derivation of the total phase of the synthetic wave [WE] is illustrated in FIGS. 6 to 8. In this example, the laser diodes are modulated at the same ramp frequency but are activated alternately in time, although other, but similar logic sequences can be constructed for the other modulation schemes already described.

The linear wavelength ramp produced from the laser diodes needs to be of sufficient amplitude to drive the output transfer function of the Fabry-Perot sensor cavity through one complete fringe. This is the signal output form given by the photo-detector and will be one cycle of a sinusoidal wave. As the path length of the sensor cavity changes so the phase of this sine wave will alter in consequence. This will be the case for each laser diode used in the two laser system. Since the laser diodes are to operate alternately, the detector output will first show the transfer function of one laser and then followed by that of the other laser. Due to the slight difference in wavelength of the two diodes, the movement in phase of each of the transfer functions will not be equal for a given change in optical path length change in the cavity. It is the difference in phase between these two transfer functions that is a measure of the change in cavity path length and, hence, a change in temperature. However, due to the choice in method of modulating the laser diodes, it is not possible to measure this phase directly in a single operation. Instead, the phase of each transfer function is measured sequentially in time (relative to the laser modulation ramp) and then these phases are subtracted to give the desired result.

FIG. 6 illustrates a circuit having the logic structure necessary to stabilise the laser diode output signal. The circuit has a detector 20 formed by a photo-diode and an amplifier which generates an output to a combined broad band pass filter (to take out the high frequency fly-back signal) and square wave converter 21. The output of that filter and converter 21 is fed to two processing channels, one to stabilize the phase and the other to stabilize the period of the transfer function of the reference channel. The signal from the filter and converter 21 is fed to a phase counter 22 and the output of that counter 22 fed to a comparator 23 which also receives a signal from a reference phase memory 24. The output of the comparator 23 is fed to a bias control 25 for the laser diode 26. Stabilizing the phase P of the reference signal, stabilizes the wavelength of the output from the laser diode. The output of the filter and converter 21 is also fed to a period counter 27, the output of which is fed to a comparator 28 which also receives a signal from a reference period memory 29. The output of the comparator 28 is fed to a current ramp controller 30 for the laser diode 26, to stabilize the period of the transfer function in the interferometer cavities. The output of the current ramp controller 30 is also fed to a square wave converter 31 and then back to the phase counter 27. The feedback control circuit shown in FIG. 6 is provided for each laser diode.

FIG. 7 illustrates a circuit having the logic structure necessary to derive the total phase of the synthetic wave [WE]. It includes the detector 20 and the filter and converter 21 of the circuit of FIG. 6, but for this circuit the output of the filter and converter 21 is fed to a phase counter 40, which also receives an input from the square wave converter 31 connected to the current ramp controller 30 of the circuit of FIG. 6. The phase counter 40 generates two outputs which are respectively fed to two phase count stores 41, 42, one for each wavelength [W1, W2]. The outputs of the two phase count stores 41, 42 are fed to a subtractor 43 which subtracts one phase count from the other, and the result fed to a comparator 44 which decides if the result from the subtractor 43 is greater than a reference value derived from a reference phase memory 45. A positive result from the comparator 44 causes the subtracted result from subtractor 43 to be fed to an adder 46, which adds the reference value from memory 45 and outputs the signal to a scaler 47 and hence to a display 48. If, however, the comparator 44 detects a negative result, the result from the subtractor 43 is fed to another subtractor 49, which subtracts the reference value from memory 45 before the output is fed to the scaler 47. Since the sources (laser diodes) are operated alternately in this arrangement, it is necessary also to provide a switching circuit (not shown) to synchronise the signal and reference processing with the operation of the sources.

The system is capable of producing a two orders of magnitude improvement in resolution if the transfer function of one of the laser diodes is inspected in addition to that of the laser diode pair. While the resolution limit of the synthetic wavelength is of the order of 1mrads of its cycle period, the resolution of the other laser diode wavelength transfer function is 1 mrad of their cycle period. Therefore, if the particular fringe number that either of the laser diodes is currently operating in can be determined then the measurement of its phase will yield an improvement in the resolution given by: Resolution of Single Laser [W1], $$[Res\ E] = \frac{[\text{Effective Wavelength}]}{[\text{Wavelength [1]}]} \times [Res\ 1] \quad (1)$$

In order to determine which of the fringes of wavelength [W1] that the system is working in, the phase of the synthetic wavelength obtained from the subtraction of the two individual phases of the two laser diodes is divided by the phase equivalent in the synthetic wave [WE] of one fringe of laser diode [W1]. That is:

$$\text{Phase Equivalent of } [W1] \text{ in } [WE] = \frac{[\text{Wavelength 1}]}{[\text{Wavelength } E]} \times [2\pi] \quad (2)$$

Fringe Number, $N =$ (3)

$$\text{INTEGER PART} \frac{[\text{Phase of } [WE]]}{[2\pi]} \times \frac{[\text{Wavelength } E]}{[\text{Wavelength 1}]}$$

Due to the resolution limitation in determining the phase of [WE] the fringe number, N, will be in doubt on occasions by +one fringe. This is so because if the phase of [WE] is determined to +one resolution point, [Res E], about the transition points between consecutive fringes it is not known with certainty whether the system is operating in the Nth or the (Nth+1) fringe or at the other extreme, the Nth or the (Nth−1) fringe. The way to resolve this ambiguity is to inspect the phase remainder from the above division. Three particular cases are possible:

(A) If the phase remainder is either greater than or less than one resolution band about the two fringe boundaries (0 and 2 $\pi$), it lies in the Nth fringe and the total phase is given by:

Phase Total = [2π] × [N] + [Phase of W1]]   ... (4)

(B) If the phase remainder is within one resolution band of the zero phase boundary again the phase of laser diode [W1] is inspected. If this is less than [Res E] it lies at the beginning of the Nth fringe and the total phase is again given by (4) above. If, however, it is greater than [Res E] it lies at the top of the previous (Nth−1) fringe and the total phase is now given by:

Phase Total = [2 π] × [N−1] + [Phase of [W1]]   ... (5)

(C) If the phase remainder is within one resolution band of the [2 π] fringe boundary it lies at the top of the Nth fringe or the bottom of the (Nth+1) fringe. Again, the phase of [W1] is inspected. If it is greater than (1-[Res E]) it lies at the top of the Nth fringe and the total fringe is again given by (4). If, however, it is less than [Res E] it lies at the beginning of the (Nth+1) fringe and the total phase is given by:

Phase Total = [2 π] × [N+1] + [Phase of [W1]]   ... (6)

The minimum phase resolution needed in [WE] to determine the operating fringe number of [W1] is one half a fringe in [W1]. This then puts a restraint on the minimum separation of the laser diode wavelengths acceptable. In order to resolve one half a cycle of [W1] = 780 nm then [W2] is determined from equation (1). If the resolution limit of [WE] is of the order of 5 Mrads (or better) and the resolution in wavelength required is [W1]/2 then (1) becomes:

[W1]/2 = [WE] × [5E−3]/[2 π]

i.e. [[W1]−[W2]]/[W2] = 5E−3/[π]

[W2] = [W1]/[[5E−3]/[π]+1]

For [W1] = 780 nm, [W2] = 778.8 nm

Therefore, the minimum separation of the two laser diodes' wavelengths will be of the order of ~2 nm.

Selection of wavelength difference greater than this value for diodes operating about 780 nm will ensure that there is adequate resolution for the synthetic wavelength to be able to determine the fringe number of operation of one of the laser diodes.

In the limit, with a resolution limit in WE equal to 1 mrad then the separation in operating wavelengths of the laser diodes is only 0.24 nm.

The additional circuitry to perform this high resolution processing is illustrated in FIG. 8. This circuit is added to the circuit of FIG. 7. Thus, the output of the scaler 47 is fed to a divider 50, which also receives an input from a memory store 51 storing a constant equal to [WE/W1]. The divider 50 divides the signal by the constant and splits the result into an integer signal and an exponent signal fed to an integer store 52 and an exponent store 53 respectively. The output of the exponent store 53 is fed to a comparator 54 which detects if the exponent is greater than 0.5. If the answer is yes, then the output of the exponent memory 53 is fed to another comparator 55, which detects if the reference value generated by a reference source 56 (which subtracts a zero reference value from store 57 from the phase count store 41 of FIG. 5) is greater than 0.5. If the answer from the comparator 55 is yes, then a signal is fed to an accumulator 58 which adds the output of the integer store 52 and the reference source 56, and generates an output which is fed to a scaler 59 and then to a display 60. If the result of the comparison of comparator 39 is no, then a signal is fed to an accumulator 61 which adds the output of the integer store, the output of the reference source 56 and 1 (one) and supplies the result to the scaler 59. Returning now to the comparator 54, if this detects that the exponent is not greater than 0.5, it feeds a signal to a comparator 62 which detects if the reference value from source 56 is less than 0.5. If the answer to that comparison is yes, a signal is fed to the accumulator 58. If, however, the answer is no, then a signal is fed to an accumulator 63 which adds the output of the integer store 37, the output of the source 56 and subtracts 1 (one) and again feeds the result to the scaler 59.

The comparisons, subtractions and additions required in the signal processing in order to determine the total cavity phase change can be conveniently carried out by suitable electronic functions as, for example, is possible by use of a microprocessor unit. In event, the unique range of the interferometer is given by the two laser diodes of different wavelengths operating in the same cavity(s). The resolution of the optical path change is given by that equivalent resolvable phase increment of one of the laser diode transfer functions. Hence, the system has both a large dynamic range and a high resolution limit. The system is self-referencing and will provide a unique reading that will be recoverable at switch-on or after the event of an intermittent power failure.

Thus, by using closer matched laser diode wavelengths, e.g. of the CD player type (780 nm) a two stage process will provide an unambiguous temperature reading with a resulting high resolution. The first process uses the two wavelength system to determine which fringe number that one of the laser diodes is operating in. The second stage then inspects the phase information of this single laser diode to determine the appropriate phase addition to be made. The wavelength separation of the two laser diodes need only be sufficient to permit the fringe number to be resolvable to within half a fringe or better. This sets the wavelength separation at 2 nm or greater. Therefore the restrictions placed on the selection of the laser diodes are now greatly reduced. Provided that they are within +10 nm of 780 nm and each pair has a separation of, say the order of 2 nm or more the system should give the desired performance. In the case using wavelengths of 775 nm and 785 nm a temperature range of 1233° C. is theoretically possible or any sub-division of this (e.g. 300° C.), is obtainable by comparing the phase relationship of the two diodes' transfer functions. Further, by inspection of the phase position of one of the laser diodes it is possible to obtain a resolution down to 0.01 degree. Therefore, the sensor has both the advantages of a large dynamic range and a high resolution that would make it suitable for any temperature application.

The linearity of the temperature sensor is of importance. The change in path length of the fiber optic FabryPerot cavity will be due to a change in the refractive index of the fiber and to the change in physical length of the cavity. The linearity of a Michelson fiber optic interferometer is very linear over a limited temperature range. For example, around the 30 to 50 degree range used for body temperature measurements in medical applications the linearity is good. However, over an extended temperature range e.g. $-60°$ to 200° C. there is a perceptable deviation from an exact linear response. It will be necessary to provide a correction algorithm to take account of this behavior. A polynomial expression can be determined for the curve shape (i.e. $a+bX+cX^2+$) of this non-linear effect and stored in the processor unit. The measured temperature value can then be transformed by the polynomial.

Since the processing of the fringe patterns from the sensor may thus be largely a manipulation of digital numbers with either comparisons, additions, subtractions, or divisions, these operations would be best suited to a dedicated processor unit. This approach would reduce the overall complexity of the processing. It would also provide the ability to carry out the correction algorithm conveniently. Such an approach would give the dedicated facilities necessary and also provide a versatile sensor system that could be easily converted for many sensor applications (e.g. any desired temeprature range, pressure range etc.) while implementing the same sensor configuration.

What is claimed is:

1. An optical fiber measuring system, comprising:
   a radiation source means for generating radiation of two different wavelengths;
   an optical fiber connected to said radiation source means;
   an interferometer connected to said optical fiber for generating, from said radiation, two interference signals corresponding respectively to each of said two different wavelengths in said optical fiber;
   means for modulating each of said two interference signals with a modulating signal so as to produce separate two modulated interference signals; and
   means for analyzing phase differences between said modulating signal and each of said two modulated interference signals, for comparing said phase differences, and for analyzing relative changes in said phase differences.

2. A system according to claim 1, further including:
   a further interferometer;
   a further optical fiber; and
   a coupler between said source and said optical fiber and said further optical fiber for selectively passing radiation from said source to one of said optical fiber and said further optical fiber.

3. A system according to claim 2 having an enclosure containing said further interferometer for maintaining said further interferometer under reference conditions.

4. A system according to claim 1 wherein said interferometer is formed of optical fiber material.

5. A method of measuring changes in an interferometer, comprising:
   generating radiation of two different wavelengths using a radiation source;
   supplying radiation from said source to the interferometer via an optical fiber;
   generating, in the interferometer, two interference signals corresponding respectively to each wavelength in said optical fiber from the radiation of each wavelength;
   modulating each of said two interference signals with a modulating signal so as to generate two modulated interference signals; and
   analyzing the phase differences between said modulating signal and said two modulated interference signals, comparing said differences, and analyzing relative changes in said phase differences.

6. A method according to claim 5, wherein the radiation of the two wavelengths is supplied sequentially to the interferometer.

7. A method according to claim 5 further including analysing changes in the phase of radiation of one of the wavelengths.

8. An optical fiber measuring system comprising:
   an interferometer;
   a radiation source for generating radiation of two different wavelengths;
   a first optical fiber connecting said radiation source to said interferometer;
   means for detecting and analyzing changes in the phase relationship between said two different wavelengths of said radiation in said first optical fiber;
   a further interferometer;
   a further optical fiber; and
   a coupler between said source and said first optical fiber and said further optical fiber for selectively passing radiation from said source to one of said first optical fiber and said further optical fiber.

9. A system according to claim 8 having an enclosure, containing said further interferometer, for maintaining said further interferometer under reference conditions.

* * * * *